United States Patent
Liu et al.

(10) Patent No.: US 10,279,472 B2
(45) Date of Patent: May 7, 2019

(54) SERVO CONTROL SYSTEM AND ROBOT

(71) Applicant: UBTECH Robotics Corp., Shenzhen (CN)

(72) Inventors: Dong Liu, Shenzhen (CN); Youjun Xiong, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 348 days.

(21) Appl. No.: 15/321,727

(22) PCT Filed: Oct. 28, 2016

(86) PCT No.: PCT/CN2016/103828
§ 371 (c)(1),
(2) Date: Dec. 22, 2016

(87) PCT Pub. No.: WO2018/076295
PCT Pub. Date: May 3, 2018

(65) Prior Publication Data
US 2018/0257222 A1  Sep. 13, 2018

(51) Int. Cl.
*B25J 9/00* (2006.01)
*B25J 9/12* (2006.01)
*B25J 13/00* (2006.01)
*G05B 19/042* (2006.01)
*G05B 19/414* (2006.01)

(52) U.S. Cl.
CPC ............ *B25J 9/126* (2013.01); *B25J 9/0009* (2013.01); *B25J 13/006* (2013.01); *G05B 19/414* (2013.01); *G05B 19/042* (2013.01); *G05B 2219/34013* (2013.01); *Y10S 901/06* (2013.01); *Y10S 901/23* (2013.01)

(58) Field of Classification Search
CPC ................................ G05B 19/414; B25J 9/12
USPC ............ 318/560, 567, 568.1, 568.11, 568.12
See application file for complete search history.

(56) References Cited

U.S. PATENT DOCUMENTS 6,854,053 B2 *  2/2005  Burkhardt .............. G06F 15/17
340/9.1

* cited by examiner

*Primary Examiner* — David Luo

(57) ABSTRACT

The present invention discloses a servo control system and a servo. A servo control system includes a main control module; and a communication module including a first communication interface, a second communication interface and a control switch unit. First communication terminal and second communication terminal of the control switch unit are correspondingly coupled to the first communication interface and the second communication interface. First enabling port and second enabling port of the control switch unit are correspondingly coupled to two enabling terminals of the main control module. The main control module receives, via the first enabling port, the first communication terminal and the first communication interface, an identification number or an identification number together with action instruction information from a servo of upper level, and transmits, via the second enabling port, the second communication terminal and the second communication interface, an identification number or an identification number together with action instruction information of a servo of lower level. In the above manner, the present invention can assign an identification number to a servo during initialization of the servo, avoiding the installing inconvenience caused by that servo identification numbers are fixed.

18 Claims, 7 Drawing Sheets

SERVO CONTROL SYSTEM AND ROBOT

BACKGROUND

1. Technical Field

The present disclosure generally relates to automation control technology, and particularly to a servo control system and a robot.

2. Description of Related Art

With the advancement of technology, robotic technology has been greatly developed and been gradually into people's daily lives. In robotic technology, servos are important assemblies of a robot. A servo control system is an important component of a servo and controls each servo of a robot to perform various operations.

The ID information of each servo of exiting robots is fixed. That is, after the ID information of a servo is set, the position of the servo is also fixed, such as the order of the shoulder/leg servos. They cannot be freely installed after being detached, which is inconvenient for installing. In the servo control systems of related arts, the ID information of servos are reassigned via communication interfaces after the servos are reinstalled. Generally, two communication interfaces are used and simultaneously coupled to a controller via an electronic switch circuit. However, the input terminals of the electronic switch circuit are simultaneously coupled to the two communication interfaces, which cause that the controller is unable to judge which communication interface is the input terminal and which communication interface is the output terminal, resulting in that corresponding ID information is unable to be normally assigned to the servos.

SUMMARY

In view of this, the present invention provides a servo control system and a robot that can assign identification numbers to servos when the servos are being initialized, which avoids the installing inconvenience caused by that servo identification numbers are fixed.

In order to resolve the aforementioned problems, the present invention provides a servo control system applied to a servo. The servo control system includes a main control module including two enabling terminals; and a communication module including a first communication interface, a second communication interface and a control switch unit. The control switch unit includes a first communication terminal, a second communication terminal, a first enabling port, and a second enabling port. The first communication terminal and the second communication terminal are correspondingly coupled to the first communication interface and the second communication interface. The first enabling port and the second enabling port are coupled to the two enabling terminals. The main control module receives, via the first enabling port, the first communication terminal and the first communication interface, an identification number or an identification number together with action instruction information from a servo of upper level coupled to the servo, and transmits, via the second enabling port, the second communication terminal and the second communication interface, an identification number or an identification number together with action instruction information of a servo of lower level coupled to the servo.

Wherein, the first communication interface and the second communication interface both are level detection ports. The main control module outputs a first enabling signal to the first enabling port when detecting that the first communication interface is at high level. The control switch unit communicates with the servo of upper level via the first communication interface and transmits corresponding identification number or identification number together with action instruction information to the main control module. The main control module outputs a second enabling signal to the second enabling port when detecting that the second communication interface is at high level. The control switch unit communicates with the servo of lower level via the second communication interface and transmits corresponding identification number or identification number together with action instruction information to the servo of lower level.

Wherein, the servo control system further includes a power supply module and a charge detection module coupled to the main control module. The power supply module is configured to provide a power supply for the servo, and the charge detection module is configured to collect a charge of a battery inside the servo.

Wherein, the servo control system further includes an angle collection module coupled to the main control module. The angle collection module is configured to acquire information of rotation angle of the servo, and the main control module is further configured to control motion of the servo according to the information of angle.

Wherein, the servo control system further includes a driving module coupled to the main control module. The driving module is configured to receive a control signal transmitted from the main control module and output a driving pulse signal according to the control signal to drive an electric motor arranged in the servo to rotate.

Wherein, the control signal comprises an angle control signal, a speed control signal and an enabling signal.

Wherein, the servo control system further includes at least one filter circuit. The at least one filter circuit is coupled between the driving module and the electric motor, and configured to perform a filtering process to the driving pulse signal.

Wherein, the driving module is further configured to detect a current operating current of the electric motor and feedback the current operating current of the electric motor to the main control module, and the main control module adjusts a waveform of the driving pulse signal according to the current operating current of the electric motor.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

In order to resolve the aforementioned problems, the present invention further provides a robot including a central processor, a plurality of servos of first level coupled to the central processor, and servos of other levels coupled to the servos of first level in sequence. Each of the servos includes a servo control system. The servo control system includes a main control module including two enabling terminals; a communication module including a first communication interface, a second communication interface and a control switch unit. The control switch unit includes a first communication terminal, a second communication terminal, a first enabling port, and a second enabling port. The first communication terminal and the second communication terminal are correspondingly coupled to the first communication interface and the second communication interface. The first enabling port and the second enabling port are coupled to the two enabling terminals. The main control module receives, via the first enabling port, the first communication terminal and the first communication interface, an identification number or an identification number together with action instruction information from a servo of upper level coupled to the servo, and transmits, via the second enabling port, the second communication terminal and the second communication interface, an identification number or an identification number together with action instruction information of a servo of lower level coupled to the servo.

Wherein, the first communication interface and the second communication interface both are level detection ports. The main control module outputs a first enabling signal to the first enabling port when detecting that the first communication interface is at high level. The control switch unit communicates with the servo of upper level via the first communication interface and transmits corresponding identification number or identification number together with action instruction information to the main control module. The main control module outputs a second enabling signal to the second enabling port when detecting that the second communication interface is at high level. The control switch unit communicates with the servo of lower level via the second communication interface and transmits corresponding identification number or identification number together with action instruction information to the servo of lower level.

Wherein, the servo control system further includes a power supply module and a charge detection module coupled to the main control module. The power supply module is configured to provide a power supply for the servo, and the charge detection module is configured to collect a charge of a battery inside the servo.

Wherein, the servo control system further includes an angle collection module coupled to the main control module. The angle collection module is configured to acquire information of rotation angle of the servo, and the main control module is further configured to control motion of the servo according to the information of angle.

Wherein, the servo control system further includes a driving module coupled to the main control module. The driving module is configured to receive a control signal transmitted from the main control module and output a driving pulse signal according to the control signal to drive an electric motor arranged in the servo to rotate.

Wherein, the control signal comprises an angle control signal, a speed control signal and an enabling signal.

Wherein, the servo control system further includes at least one filter circuit. The at least one filter circuit is coupled between the driving module and the electric motor, and configured to perform a filtering process to the driving pulse signal.

Wherein, the driving module is further configured to detect a current operating current of the electric motor and feedback the current operating current of the electric motor to the main control module, and the main control module adjusts a waveform of the driving pulse signal according to the current operating current of the electric motor.

Wherein, the servo control system further includes a temperature collection module coupled to the main control module. The temperature collection module is configured to collect a temperature of the electric motor. If the collected temperature of the electric motor is greater than a preset threshold value, the main control module controls the electric motor to stop rotating, or reduces a rotation speed of the electric motor.

With the aforementioned technical solutions, the beneficial effects of the present invention are: Being different from the existing technology, the servo control system of the present invention includes a main control module including two enabling terminals. A communication module includes a first communication interface, a second communication interface and a control switch unit. The main control module receives, via the first enabling port, the first communication terminal and the first communication interface, an identification number or an identification number together with action instruction information from a servo of upper level coupled to the servo, and transmits, via the second enabling port, the second communication terminal and the second communication interface, an identification number or an identification number together with action instruction information of a servo of lower level coupled to the servo. Identification numbers can be assigned to servos when the servos are being initialized, which avoids the installing inconvenience caused by that servo identification numbers are fixed.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained based on these drawings without creative work.

DETAILED DESCRIPTION

The technical solutions of the embodiment(s) of the present invention will be clearly and completely described in conjunction with the drawings of the embodiment(s) of the present invention. Obviously, the described embodiment(s) is only a part of embodiments of the present invention, but not all the embodiments. Based on the embodiment(s) of the present invention, all other embodiments obtained by those skilled in the art without creative work are all within the protection scope of the present invention.

Figure 1:
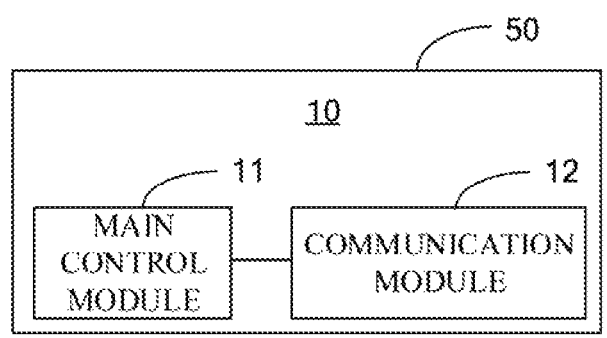
FIG. 1 is a schematic block diagram of a servo control system of a first embodiment of the present invention.
Figure 2:
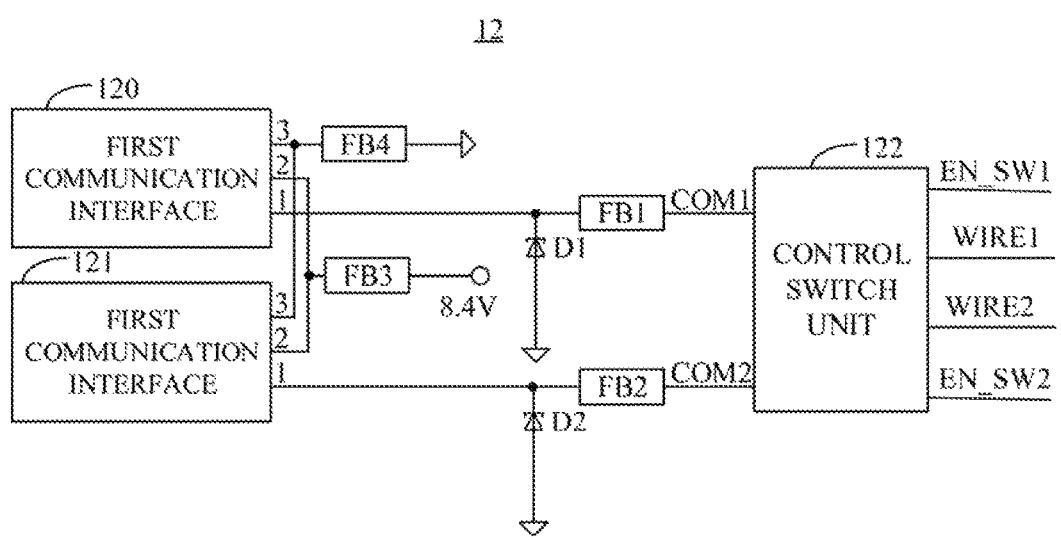
FIG. 2 is a schematic circuit diagram of a communication module of an embodiment of the present invention.

Referring to FIGS. 1 and 2, FIG. 1 is a schematic block diagram of a servo control system of a first embodiment of the present invention, and FIG. 2 is a schematic circuit diagram of a communication module of an embodiment of the present invention. A servo control system 10 is applied to a servo 50. The servo control system 10 includes a main control module 11 and a communication module 12. The main control module 11 includes two enabling terminals. The communication module 12 includes a first communication interface 120, a second communication interface 121 and a control switch unit 122. The control switch unit 122 includes a first communication terminal COM1, a second communication terminal COM2, a first enabling port EN_SW1, and a second enabling port EN_SW2. The first communication terminal COM1 and the second communication terminal COM2 are correspondingly coupled to the first communication interface 120 and the second communication interface 121. The first enabling port EN_SW1 and the second enabling port EN_SW2 are correspondingly coupled to the two enabling terminals of the main control module 11. The main control module 11 receives, via the first enabling port EN_SW1, the first communication terminal COM1 and the first communication interface 120, an identification number or an identification number together with action instruction information from a servo of upper level coupled to the servo, and transmits, via the second enabling port EN_SW2, the second communication terminal 121 and the second communication interface COM2, an identification number or an identification number together with action instruction information of a servo of lower level coupled to the servo.

First terminals 1 of the first communication interface 120 and the second communication interface 121 transmit, respectively, via fuses FB1 and FB2, an identification number or an identification number together with action instruction information. The first terminals 1 of the first communication interface 120 and the second communication interface 121 are further grounded, respectively, via a first diode D1 and a second diode D2. Second terminals 2 of the first communication interface 120 and the second communication interface 121 are coupled to a power supply of 8.4V via a fuse FB3. Third terminals 3 of the first communication interface 120 and the second communication interface 121 are grounded via fuse FB4. The first communication interface 120 and the second communication interface 121 both are level detection ports. The main control module 11 outputs a first enabling signal to the first enabling port EN_SW when detecting that the first communication terminal COM1 is at high level, that is, the first communication interface 120 is at high level. The control switch unit 122 communicates with the servo of upper level via the first communication interface 120 and transmits corresponding identification number or identification number together with action instruction information to the main control module 11. The main control module 11 outputs a second enabling signal to the second enabling port EN_SW2 when detecting that the second communication terminal COM2 is at high level, that is, the second communication interface is at high level. The control switch unit 122 communicates with the servo of lower level via the second communication interface and transmits corresponding identification number or identification number together with action instruction information to the servo of lower level. In the present embodiment, the identification code is the only serial number code that represents a certain servo and distinguishes the servo from other servos.

In an embodiment of the present invention, more specifically, the first communication terminal COM1 is coupled to a first terminal of the first communication interface 120. The second communication terminal COM2 is coupled to a first terminal of the second communication interface 121. The first enabling port EN_SW1 and the second enabling port EN_SW2 are respectively coupled to the two enabling terminals (not shown) of the main control module 11. When the main control module 11 detects, via the first enabling port EN_SW1, that the first communication terminal COM1 is at high level, it outputs a first enabling signal to the first enabling port EN_SW1. The control switch unit 122 communicates with the servo of upper level via the first communication interface 120 and transmits corresponding identification number or identification number together with action instruction information to the main control module 11. When the main control module 11 detects, via the second enabling port EN_SW2, that the second communication terminal COM2 is at high level, it outputs a second enabling signal to the second enabling port EN_SW2. The control switch unit 122 communicates with the servo of lower level via the second communication interface 121 and transmits corresponding identification number or identification number together with action instruction information to the servo of lower level. That is, the communication modules uses a half-duplex asynchronous communication.

The more specific working principle of the communication module 12 is as follows.

During a servo of current level is being initialized, when the main control module 11 detects that the first communication terminal COM1 is at high level, the second communication terminal COM2 is at low level at this time, it outputs a first enabling signal to the first enabling port EN_SW1. The control switch unit 122 receives, via the first communication interface 120, the identification number assigned to the servo of current level by the servo of upper level, simultaneously receives action instruction information, and transmits them to the main control module 11 via a signal line WIRE1. When the main control module 11 detects that the second communication terminal COM2 is at high level, the first communication terminal COM1 is at low level at this time, it outputs a second enabling signal to the second enabling port EN_SW2. The main control module 11 transmits an identification number to the control switch unit 122 via a signal line WIRE2. The control switch unit 122 transmits corresponding identification number assigned to the servo of lower level via the second communication interface 121, and simultaneously outputs action instruction information. Since the order of servos changes easily after detaching and reinstalling, such as the order change of servos of originally mounted legs, the present embodiment uses the first communication terminal COM1 or the second communication terminal COM2 of the control switch unit 122 to respectively and correspondingly communicate with the first communication interface 120 or the second communication interface 121 to transmit identification number or identification number together with action instruction information. That is, in the present embodiment, when the servo of current level is being initialized, using the first communication interface 120 and the first communication terminal COM1 to receive identification numbers assigned to the servo of current level by the servo of upper level, and using the second communication interface 121 and the second communication terminal COM2 to transmit identification numbers assigned to the servo of lower level, it then realizes assigning a corresponding identification number to each servo. In this way, the main control module 11 can automatically identify the first communication interface 120 to be an input port, and the second communication interface 121 to be an output port, thereby accomplishing that the identification numbers are assigned in turn during the initializing process of all the servos, and avoiding the installing inconvenience caused by that identification numbers are fixed.

After the initialization of the current servo finishes, when the servo of current level operates normally, the servo of current level communicates with the servo of upper level through the first communication interface 120 and the first communication terminal COM1 of the control switch unit 122, and transmits corresponding identification number and action instruction information; and communicates with the servo of lower level through the second communication interface 121 and the second communication terminal COM2 of the control switch unit 122, and transmits corresponding identification number and action instruction information, to cause a corresponding servo to perform corresponding action instructions. The working of the servo of current level, and the servo of upper level or the servo, affect each other. Certainly, in other embodiments of the present invention, during normal working, only action instruction information may be transmitted between the servo of current level, and the servo of upper level or the servo of lower level. The action instruction information carries the identification number(s) of the he servo of upper level or the servo of lower level that is coupled to the servo of current level.

Figure 3:
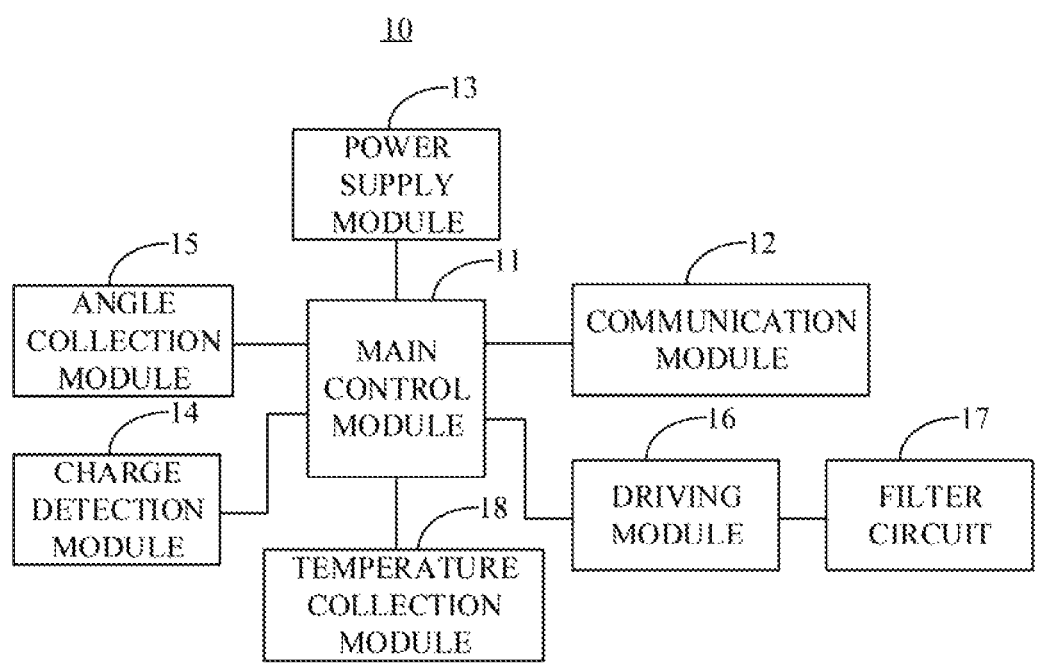
FIG. 3 is a schematic block diagram of a servo control system of a second embodiment of the present invention.
Figure 4:
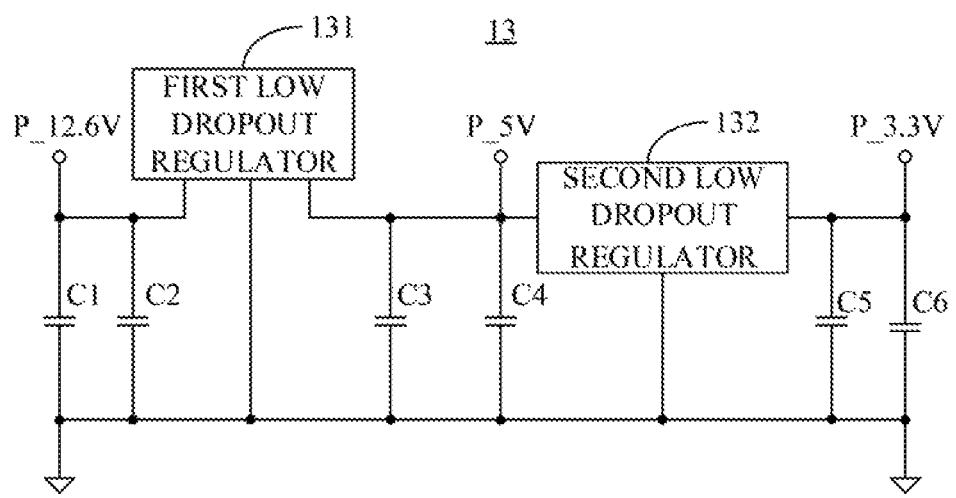
FIG. 4 is a schematic circuit diagram of a power supply module of an embodiment of the present invention.

Referring to FIG. 3, the servo control system 10 further includes a power supply module 13 and a charge detection module 14 coupled to the main control module 11. The power supply module 13 is used to provide a power supply for the servo of current level. The charge detection module 14 is used to collect a charge of a battery inside a servo. Referring to FIG. 3, the power supply module 13 includes a first low dropout regulator 131, a first capacitor C1, a second capacitor C2, a third capacitor C3, a fourth capacitor C4, a fifth capacitor C5, a sixth capacitor C6, and a second low dropout regulator 132. The first capacitor C1 and the second capacitor C2 are connected to each other in parallel between a first voltage terminal P_12.6V and the ground. Wherein, the first voltage terminal P_12.6V provides a reference power supply voltage of 12.6V. The reference power supply voltage of 12.6V is converted into a first power supply voltage of 5V through the first low dropout regulator 131. The third capacitor C3 and the fourth capacitor C4 are connected to each other in parallel between a second voltage terminal P_5V and the ground. The first power supply voltage of 5V is converted into a second power supply voltage of 3.3V through the second low dropout regulator 132. The fifth capacitor C5 and the sixth capacitor C6 are connected to each other in parallel between a third voltage terminal P_3.3V and the ground. Wherein, the second voltage terminal P_5V outputs a second power supply voltage of 5V, and the third voltage terminal P_3.3V outputs a second power supply voltage of 3.3V. The power supply module 13 outputs, via the first low dropout regulator 131 and the second low dropout regulator 132, the first power supply voltage of 5V and the second power supply voltage of 3.3V, thereby providing reliable power supply voltage for the current level servo 20.

In an embodiment of the present invention, referring to FIG. 3, the servo control system 10 further includes an angle collection module 15 coupled to the main control module 11. The angle collection module 15 is used to acquire information of rotation angle of a servo. The main control module 11 further controls motion of the servo according to the information of angle. The angle collection module 15 may use a potentiometer or a magnetic encoding chip to acquire information of rotation angle of a servo. Specifically, it is to acquire the rotation angle of the motor in a servo so as to determine that the motor rotates in a forward direction or in a reverse direction.

Figure 5:
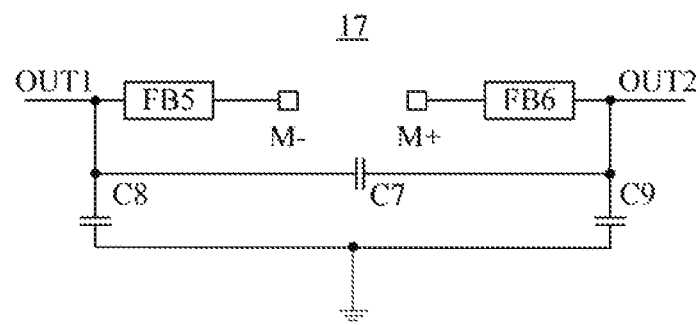
FIG. 5 is a schematic circuit diagram of a filter circuit of an embodiment of the present invention.

In an embodiment of the present invention, the servo control system 10 further includes a driving module 16 and at least one filter circuit 17. The driving module 16 is coupled to the main control module 11. The filter circuit 17 is coupled between the driving module 16 and an electric motor. The driving module 16 is used to receive a control signal transmitted from the main control module 11 and output a driving pulse signal according to the control signal to drive an electric motor arranged in a servo to rotate. Wherein, the control signal includes an angle control signal, a speed control signal and an enabling signal. Specifically, according to the angle control signal, the speed control signal and the enabling signal, the driving module 16 outputs two driving pulse signals that are respectively transmitted to two ends of the electric motor. The filter circuit 17 is used to perform a filtering process to the driving pulse signals. The driving module 16 is further used to detect a current operating current of the electric motor and feedback the current operating current of the electric motor to the main control module 11, causing the main control module 11 to adjust a waveform of the driving pulse signal according to the current Please refer to FIG. 5 for the filter circuit 17. The driving module 16 outputs two driving pulse signals OUT1 and OUT2. The driving pulse signal OUT1 is coupled to an M− terminal of the electric motor via a fuse FB5. The driving pulse signal OUT2 is coupled to an M+ terminal of the electric motor via a fuse FB6. A seventh capacitor C7 is connected in parallel to two ends of the electric motor. The driving pulse signal OUT1 is further grounded via an eighth capacitor C8. The driving pulse signal OUT2 is further grounded via a ninth capacitor C9.

Figure 6:
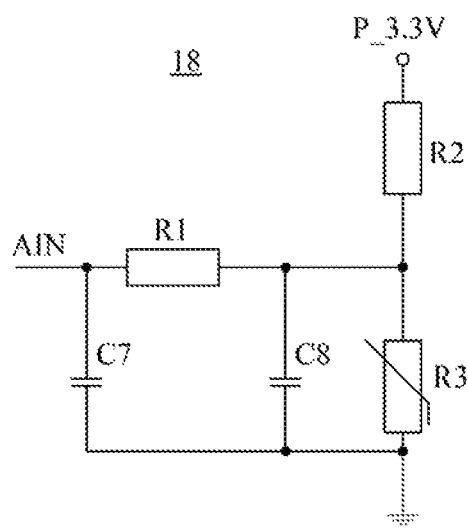
FIG. 6 is a schematic circuit diagram of a temperature detecting module of an embodiment of the present invention.

Referring further to FIG. 3, the servo control system 10 further includes a temperature collection module 18 coupled to the main control module 11 and used to collect a temperature of an electric motor. If the collected temperature of the electric motor is greater than a preset threshold value, the main control module 11 controls the electric motor to stop rotating, or reduces a rotation speed of the electric motor. Wherein, the preset threshold value can be set according to need and is not limited herein. Referring to FIG. 6, the temperature collection module 18 includes a first resistor R1, a second resistor R2, a third resistor R3, the seventh capacitor C7 and the eighth capacitor C8. An end of the third resistor R3 is grounded, and the other end is coupled to an output terminal AIN via the first resistor R1. The other end of the third resistor R3 is further coupled to the third voltage terminal P3.3V via the second resistor R2. The output terminal AIN is coupled to the main control module 11. The seventh capacitor C7 is connected in parallel between the output terminal AIN and ground. The eighth capacitor C8 is connected in parallel to the two ends of the third resistor R3. In the present embodiment, the third resistor R3 is a negative temperature coefficient thermistor, its resistance changes along with temperature, divides voltage with the second resistor R2, and outputs it to the main control module 11 via the first resistor R1.

Figure 7:
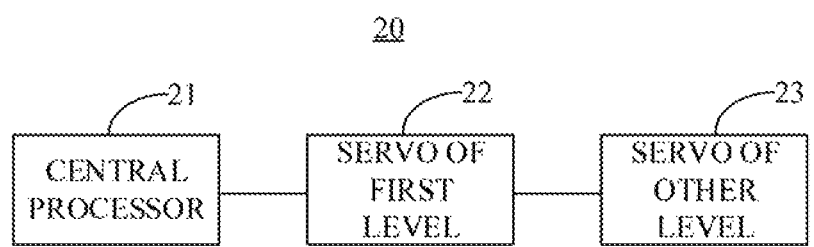
FIG. 7 is a schematic block diagram of a robot of an embodiment of the present invention.

The present invention further provides a robot. As shown in FIG. 7, the robot 20 includes a central processor 21, a plurality of servos 22 of first level coupled to the central processor 21, and a plurality of servos 23 of other levels coupled to the servos 22 of first level. Each servo 22/23 respectively includes the aforementioned servo control system 10, that is, includes all the elements of the servo control system 10 described hereinbefore and corresponding connection relationships, which are not repeated herein.

In an embodiment of the present invention, a servo of any level is coupled to, at most, one servo of upper level or one servo of lower level. In the servo control system of the servo 22 of the first level, the main control module 11 communicates with the central processor 21 via the first communication interface 120 of the communication module 12, receives an identification number assigned by the central processor 21 when the servo 22 of the first level is being initialized, and transmits, via the second communication interface 121 of the communication module 120, an identification number assigned to a servo of lower level if there exists the servo of lower level. Specifically, using the second communication interface 121 of the communication module 120 to transmit an identification number to the servo of lower level assigned by the central processor 21, or transmit an identification number to the servo of lower level assigned by the servo 22 of the first level. In the servo control system of the servo of last level, the main control module 11 communicates with the servo of upper level only via the first communication interface 120 of the communication module 12, and receives an identification number assigned by the servo of upper level during initialization. In the servos of intermediate levels between the servos of first level and the servos of last level, the main control module 11 communicates with the servo of upper level via the first communication interface 120 of the communication module 12, and receives an identification number assigned by the servo of upper level during initialization. The main control module 11 communicates with the servo of lower level via the second communication interface 121 of the communication module 12, and transmits an identification number assigned to the servo of lower level during initialization. In this way, it can assign an identification number of each servo during initialization of the robot 20, i.e., initialization of each servo, which can avoid the installing inconvenience caused by the servo identification numbers are fixed.

In the foregoing embodiments, the first communication interface 120 and the second communication interface 121 of the communication module 12 are interchangeable. That is, the main control module 11 may communicate with a servo of lower level via the first communication interface 120 of the communication module 12, and communicate with a servo of upper level via the second communication interface 121, which is not limited herein.

In summary, in the servo control system of the present invention, the communication module 12 is used to communicate with servos of other levels that are different from the servo of current level so as to receive or transmit identification number and transmit action instruction information. During initialization of a servo, the main control module 11 identifies, via the communication module, one of the two communication interfaces as an input interface to receive and set the identification number of the servo of current level, and the other one of the two communication interfaces as an output interface to transmit corresponding identification number to a servo of lower level, and outputs a control signal to control the motion of the servo of current level according to the identification number and action instruction information. Thus, it can assign a corresponding identification number to a servo during initialization of the servo, which avoids the installing inconvenience caused by that servo identification numbers are fixed.

The foregoing descriptions are merely embodiments of the present invention, and the protection scope of the present invention is not limited thereto. All equivalent structural or process changes made according to the content of this specification and accompanying drawings in the present invention, or by directly or indirectly applying the present invention in other relevant technical fields, shall fall within the protection scope of the present invention.

What is claimed is:

1. A servo control system, applied to a servo, characterized in that the servo control system comprises:
   a main control module, comprising two enabling terminals; and
   a communication module, comprising a first communication interface, a second communication interface and a control switch unit, the control switch unit comprising a first communication terminal, a second communication terminal, a first enabling port, and a second enabling port, the first communication terminal and the second communication terminal being correspondingly coupled to the first communication interface and the second communication interface, and the first enabling port and the second enabling port being correspondingly coupled to the two enabling terminals of the main control module; wherein:
   the main control module receives, via the first enabling port, the first communication terminal and the first communication interface, an identification number or an identification number together with action instruction information from a servo of upper level coupled to the servo, and transmits, via the second enabling port, the second communication terminal and the second communication interface, an identification number or an identification number together with action instruction information of a servo of lower level coupled to the servo.

2. The servo control system according to claim 1, characterized in that the first communication interface and the second communication interface both are level detection ports, the main control module outputs a first enabling signal to the first enabling port when detecting that the first communication interface is at high level, the control switch unit communicates with the servo of upper level via the first communication interface and transmits corresponding identification number or identification number together with action instruction information to the main control module; and
   the main control module outputs a second enabling signal to the second enabling port when detecting that the second communication interface is at high level, and the control switch unit communicates with the servo of lower level via the second communication interface and transmits corresponding identification number or identification number together with action instruction information to the servo of lower level.

3. The servo control system according to claim 1, characterized in that the servo control system further comprises a power supply module and a charge detection module coupled to the main control module, the power supply module is configured to provide a power supply for the servo, and the charge detection module is configured to collect a charge of a battery inside the servo.

4. The servo control system according to claim 1, characterized in that the servo control system further comprises an angle collection module coupled to the main control module, the angle collection module is configured to acquire information of rotation angle of the servo, and the main control module is further configured to control motion of the servo according to the information of angle.

5. The servo control system according to claim 4, characterized in that the servo control system further comprises a driving module coupled to the main control module, the driving module is configured to receive a control signal transmitted from the main control module and output a driving pulse signal according to the control signal to drive an electric motor arranged in the servo to rotate.

6. The servo control system according to claim 5, characterized in that the control signal comprises an angle control signal, a speed control signal and an enabling signal.

7. The servo control system according to claim 5, characterized in that the servo control system further comprises at least one filter circuit, the at least one filter circuit is coupled between the driving module and the electric motor, and configured to perform a filtering process to the driving pulse signal.

8. The servo control system according to claim 5, characterized in that the driving module is further configured to detect a current operating current of the electric motor and feedback the current operating current of the electric motor to the main control module, causing the main control module to adjust a waveform of the driving pulse signal according to the current operating current of the electric motor.

9. The servo control system according to claim 1, characterized in that the servo control system further comprises a temperature collection module coupled to the main control module, the temperature collection module is configured to collect a temperature of the electric motor, if the collected temperature of the electric motor is greater than a preset threshold value, the main control module controls the electric motor to stop rotating, or reduces a rotation speed of the electric motor.

10. A robot, characterized in that the robot comprises a central processor, a plurality of servos of first level coupled to the central processor, and servos of other levels coupled to the servos of first level in sequence, each of the servos comprising a servo control system, the servo control system comprising:
   a main control module, comprising two enabling terminals; and
   a communication module, comprising a first communication interface, a second communication interface and a control switch unit, the control switch unit comprising a first communication terminal, a second communication terminal, a first enabling port, and a second enabling port, the first communication terminal and the second communication terminal being correspondingly coupled to the first communication interface and the second communication interface, and the first enabling port and the second enabling port being correspondingly coupled to the two enabling terminals of the main control module; wherein:
   the main control module receives, via the first enabling port, the first communication terminal and the first communication interface, an identification number or an identification number together with action instruction information from a servo of upper level coupled to the servo, and transmits, via the second enabling port, the second communication terminal and the second communication interface, an identification number or an identification number together with action instruction information of a servo of lower level coupled to the servo.

11. The robot according to claim 10, characterized in that the first communication interface and the second communication interface both are level detection ports, the main control module outputs a first enabling signal to the first enabling port when detecting that the first communication interface is at high level, the control switch unit communicates with the servo of upper level via the first communication interface and transmits corresponding identification number or identification number together with action instruction information to the main control module; and
   the main control module outputs a second enabling signal to the second enabling port when detecting that the second communication interface is at high level, and the control switch unit communicates with the servo of lower level via the second communication interface and transmits corresponding identification number or identification number together with action instruction information to the servo of lower level.

12. The robot according to claim 10, characterized in that the servo control system further comprises a power supply module and a charge detection module coupled to the main control module, the power supply module is configured to provide a power supply for the servo, and the charge detection module is configured to collect a charge of a battery inside the servo.

13. The robot according to claim 10, characterized in that the servo control system further comprises an angle collection module coupled to the main control module, the angle collection module is configured to acquire information of rotation angle of the servo, and the main control module is further configured to control motion of the servo according to the information of angle.

14. The robot according to claim 13, characterized in that the servo control system further comprises a driving module coupled to the main control module, the driving module is configured to receive a control signal transmitted from the main control module and output a driving pulse signal according to the control signal to drive an electric motor arranged in the servo to rotate.

15. The robot according to claim 14, characterized in that the control signal comprises an angle control signal, a speed control signal and an enabling signal.

16. The robot according to claim 14, characterized in that the servo control system further comprises at least one filter circuit, the at least one filter circuit is coupled between the driving module and the electric motor, and configured to perform a filtering process to the driving pulse signal.

17. The robot according to claim 14, characterized in that the driving module is further configured to detect a current operating current of the electric motor and feedback the current operating current of the electric motor to the main control module, causing the main control module to adjust a waveform of the driving pulse signal according to the current operating current of the electric motor.

18. The robot according to claim 10, characterized in that the servo control system further comprises a temperature collection module coupled to the main control module, the temperature collection module is configured to collect a temperature of the electric motor, if the collected temperature of the electric motor is greater than a preset threshold value, the main control module controls the electric motor to stop rotating, or reduces a rotation speed of the electric motor.

* * * * *